United States Patent Office 3,758,320
Patented Sept. 11, 1973

---

3,758,320
MANUFACTURE OF PIGMENTS
Robert Joseph Flores, Alsip, Ill., assignor to The Sherwin-Williams Company, Cleveland, Ohio
No Drawing. Filed May 26, 1972, Ser. No. 257,117
Int. Cl. C08h 17/02
U.S. Cl. 106—288 Q
28 Claims

ABSTRACT OF THE DISCLOSURE

Crude organic solid particles are conditioned to develop pigmentary properties. A partial milling step in which the crude pigment is subjected to particle size reduction by dry milling to an extent less than that ordinarily required to develop full tinctorial strength is followed by a breaching treatment in which the partially milled pigment is contacted with a phenol breaching agent to further condition the pigment. The resulting pigment has tinctorial strength substantially equal to that obtained by fully milling the crude particles without the breaching treatment. The phenol breaching agent may be separated from the conditioned pigment by treatment with a solubilizing base. This process is useful in the manufacture of phthalocyanines, quinacridones, etc., with substantial improvement in equipment utilization in milling.

BACKGROUND OF THE INVENTION

This invention relates to the manufacture of organic pigments. In particular, it relates to an improved process for conditioning colored organic pigment by partial comminution of the crude pigment in an attrition, shear or impact type mill followed by a further conditioning of the pigment by treating the partially milled pigment with a breaching agent to produce a pigment having high tinctorial strength.

Many of the colored pigments in commercial use at the present time are crystalline organic compounds which have been synthesized by chemical reaction. These compounds in their crude state are often relatively large as pigment particles, and satisfactory pigmentary properties are obtained only after the crude pigments have been subjected to particle size reduction and/or phase changes in the crystalline structure. For most pigments a particle size range of about 0.05 to 0.1 micron is desirable. Most commercial pigments have a particle size well below 0.2 micron, and the crude pigments, as prepared by most synthetic organic processes, have an average particle size of at least 5 to 20 microns. The desired reduction in particle size can often be achieved by prior art grinding processes alone; however, the amount of energy required and low production due to long grinding time has led workers in this art to seek shorter manufacturing methods for high quality pigments.

Numerous attempts have been made to grind pigments in the dry form without the addition of grinding aids; however, it has been found very difficult to produce satisfactory pigmentary particles. Common practice in industrial manufacture of organic pigments such as phthalocyanines is to charge an attrition-type mill with a large amount of inorganic salt in addition to the grinding elements. Typically, the prior art processes employed about 9 parts sodium chloride per part of pigment when grinding in the dry state. With the total volume of grinding elements and salt being so large, only a relatively small amount of pigment could be milled for each batch.

Prior art workers have found that subsequent treatment of dry milled pigment by agitation with a suitable organic liquid can improve the pigmentary properties. In U.S. Pats. 2,857,400 and 3,017,414 it has been demonstrated that partial milling of a crude pigment in the dry state, as by ball milling in the absence of any grinding aid, when treated with an organic liquid or aqueous emulsion of certain organic liquids can produce a satisfactory pigment. Typical organic liquids suitable for this treatment include dimethyl formamide, tetrachloroethylene, carbon tetrachloride, o-dichlorobenzene, chlorobenzene, benzene, xylene, nitrobenzene, and benzonitrile. In British Pat. 1,087,004, the organic breaching liquids for treating partially milled organic pigments included chloroform and 1,2-dibromo - 1,1,2,2 - tetrafluoroethane among the halogenated hydrocarbons suitable. Hexane and cyclohexane were found to be suitable paraffinic and cycloaliphatic hydrocarbons. It was established that about 0.1 to 3 parts organic breaching liquid per part pigment was satisfactory to provide the essential characteristic of the breaching liquid in its apparent ability to wet the pigment surface and to diffuse along grain boundaries and into interstitial areas of pigment aggregates.

In the manufacture of most organic pigments, it is usually necessary to finish the pigment in several physical forms. In some cases the pigment is ground or flushed into the vehicle with which it is to be used. In other cases the use of toners, or dry undiluted powder, is desirable. Diluted dry powders, or "lakes," undispersed presscakes, dispersed pastes and water-dispersible powders are other common forms of organic pigments offered commercially. In the prior art partial milling and breaching processes, it has been found necessary to recover the pigment from the breaching mixture by distillation or other evaporation step, followed by some other finishing step to render the pigment commercially acceptable. When the pigments are made in the form of toners or undiluted powders, the conversion of a wet pigment into dry powder form is not a straightforward matter. Most wet organic pigments tend to agglomerate irreversibly on drying, yielding hard, gritty powders of low tinctorial strength. In some manufacturing processes the addition of small amounts of fatty acids or wetting agents prior to drying can help solve this agglomeration problem. In the salt-milled pigments, which produce wet presscakes which may be dried directly to powder form, various finishing steps may be required to produce a satisfactory product. After the pigment powder has been dried, tinctorial strength may be lost during final pulverization or any amount of overgrinding may prove detrimental. Accordingly, in some manufacturing procedures, the wet presscake is dispersed directly into the final product without recovery of the dry powder. This technique is especially useful in making water-based paints. Also, the recovery of dry pigment is unnecessary when flushing is used to transfer the pigment particles from a wet presscake into a hydrophobic organic vehicle. This method has bee used commercially to by-pass recovery of the fully-conditioned pigment, thereby preventing possible loss of strength due to drying or pulverization. The typical organic pigments which are conditioned by milling and/or breaching are usually more easily wetted by an organic liquid phase than by water.

SUMMARY OF THE INVENTION

It has been found that partially milled organic pigments can be treated in the presence of a phenol breaching agent to produce a pigment which is substantially equal in tinctorial strength and other pigmentary properties to that which would be produced by fully milled pigment.

This improved process for manufacturing pigmented organic vehicles includes the steps of: (1) partially milling a crude organic pigment to an extent substantially less than that amount otherwise required to develop full pigmentary properties, usually less than half the time required for milling under essentially dry conditions; (2) treating the partially milled organic pigment by contacting an aqueous pigment slurry with sufficient phenol breaching agent to complete conditioning of the pigment, the breaching agent being substantially insoluble in water under the breaching conditions and being active to develop pigmentary qualities by contacting the pigment during breaching and (3) separating the breaching agent from the pigmented mass.

It is preferred that the phenol breaching agents used in the improved process consist essentially of phenol, cresols, lower alkyl phenols and/or xylenols which are liquid or fluent under the conditions of the breaching step and less than 10% soluble in water at room temperature. The breaching treatment may be carried out at a temperature in the range from freezing to the boiling range of the mixture. The contact time sufficient to condition the pigment is only a few minutes where very efficient agitation is used to effect contact between the partially milled pigment and the liquid breaching agent in a fluent aqueous slurry.

An advantage of the present invention is the ease with which the breaching agent can be separated from the treated pigment. Unlike the troublesome evaporation recovery used in the prior art procedures to remove the breaching agents, the phenol breaching agents used herein may be removed by liquid contact. In the preferred embodiments, the phenol is separated by treating the breached mixture with an aqueous solution of a solubilizing base, such as alkali metal hydroxide.

By this process, commercial scale milling equipment can be operated at a throughput greatly exceeding that wherein the crude organic pigment is fully conditioned by dry milling alone. Using the breaching process in combination with partial dry milling of the crude pigment, less than one half of the normal milling time is required to produce fully conditioned pigment.

DETAILED DESCRIPTION OF THE INVENTION

In describing the new process, all units are given in parts by weight unless otherwise indicated.

The present process is an improvement of the known process in which a crude organic pigment, such as copper phthalocyanine blue or quinacridone, is conditioned to essentially full pigmentary strength by two steps, including (1) partial milling of the crude pigment by comminution in a mill of the attrition, shear or impact types, and (2) contacting the partially milled pigment with a breaching agent to promote further conditioning beyond that obtained by milling alone. These two essential steps usually are combined with several other manufacturing operations, including acid extraction of the milled pigment to remove impurities, separation of the pigment from the liquid extraction phase, mixing of the breaching agent with the partially milled pigment, separation of the breaching agent after breaching of the pigment, and finishing the pigment for commercial use. These steps may be carried out in several alternative procedures and sequences. Since the manufacture of organic pigments by this process is considered most important in making phthalocyanines and quinacridones, most of the descriptive detail will be directed to these pigments; however, such modifications as would be understood by one skilled in the manufacture of organic pigments by conditioning are within the inventive concept.

The milling step used in the present process can be varied widely to accommodate the different types of crude organic pigments to be conditioned. In general, the milling apparatus may be of the attrition, shear, or impact types. The grinding methods are essentially dry, as opposed to wet slurries of the pigment in large amounts of organic liquids or water. It may be desirable to include small amounts of phase-directing organic compounds, such as tetrachloroethylene, with the crude pigment during certain conditioning steps; however, most workers in this field consider this to be essentially dry grinding. The attrition and shearing action desired for milling crude organic pigments to develop pigmentary properties may be accomplished in ball mills or rod mills of the rotary drum type, stirred or vibratory types.

The grinding media used in ball or rod mills are preferably hard metal or ceramic grinding elements of about 0.25 to 2 cm. diameter. The mill loading is largely conventional for ball milling operations, and the charge of grinding media usually occupies about half the volume of the mill. The total charge of the ball mill is usually maintained in the range of 60–75% of the mill volume. The use of grinding aids such as coarse inorganic salt (e.g. sodium chloride) is conventional, with the amount of salt used varying from about 1.5 to 9 parts by weight of salt per part dry pigment solids. For purposes of this invention the use of phase-directing materials or high temperature milling to obtain a stable crystalline phase is conventional. The dry milling operation may be carried out in the presence of grinding media alone, or grinding media plus salt grinding aid, or grinding media plus phase-directing materials, or grinding media plus salt plus phase-directing materials.

The typical production-size ball mills require about 8 hours minimum milling time to achieve the degree of partial grinding required for developing full pigmentary properties in combination with the breaching operation; whereas, equivalent milling time without breaching requires more than 24 hours, usually 30–50 hours. Also, in the typical prior art dry milling process, a rather large amount of salt grinding aid was necessary, typically about 9 parts coarse inorganic salt per part of phthalocyanine crude pigment. In the present process, not only is the throughput of the ball milling equipment increased by shorter milling time, but also the ratio of salt grinding aid to pigment can be substantially reduced, this permitting a greater amount of pigment to be milled per mill charge. It has been found that a salt grinding aid to pigment ratio of about 1.5 to 4.0 parts salt per part pigment can produce full strength pigment with 8–16 hours milling time in a large plant-scale ball mill when a phenol-type breaching agent is used.

It has been demonstrated that different size ball mills can be correlated in milling time so that the optimum amount of partial milling plus breaching treatment is obtained for any size of mill. In general, the partial milling time used in the practice of this invention is about one-fourth to ½ of that amount of ball milling necessary to produce fully conditioned pigment by dry milling alone. For instance, in a small laboratory scale ball mill which requires say 48 hours to fully condition the pigment, only 12 to 24 hours partial milling can produce equivalent pigment strength when treated with a phenol breaching agent for only ten minutes or less under high shear agitation.

It is not practical to delineate with accuracy the exact milling time. The type of pigment being treated, the mill loading, type of mill, speed of operation, size and shape of grinding elements, type and amount of salt grinding aid and desired crystalline phase all contribute to establishing the requirements of milling time.

Organic pigments which can be conditioned by the present process include several classes of commercially available materials. In the phthalocyanine class metal-free phthalocyanine in alpha or beta forms; copper, nickel, zinc, cobalt, aluminum, iron, vanadium, beryllium, lead, manganese, tin and magnesium covalent phthalocyanine complexes; halogenated and sulphonated phthalocyanines may be used. Where the chlorinated compound is conditioned, it is preferred to employ the semichloro- or monochloro-phthalocyanines. Poly-halogenated phthalocyanines containing more than about 10 halogen atoms per molecule are soft pigments which have not ordinarily been conditioned by the partial milling procedures used herein. Such phthalocyanine pigments containing up to 16 halogen atoms per molecule may be conditioned with solvent alone to produce satisfactory green pigments, according to the teachings of U.S. Pat. No. 3,353,977. In general those phthalocyanine pigments containing statistically less than one substituent per molecule are suitable. Dioxazine violet (2,9-diphenyl - 6,13 - dichlorotriphendioxazine) pigment may be treated in a manner similar to the phthalocyanines. Vat pigment such as the oxadiazoles may also be used. A fast red vat dye, 2,5-bis(1-amino-2-anthraquinonyl)-1,3,4-oxadiazole, can be conditioned by partial milling in the presence of a phenolic breaching agent. Another class of valuable organic pigments includes the quinacridones, having the parent structure (quin-(2,3b)-acridine-7,14(5,12)dione). These compounds include linear quinacridone and substituted quinacridones such as 2,9-, 3,10-, or 4,11-dichloroquinacridone, 4,11-difluoroquinacridone, lower alkyl and alkoxy derivatives of quinacridone, quinacridonequinones and mixtures of these with one another and with other compatible organic pigment particles. The quinacridones are known to form solid solutions with one another which are advantageously conditioned by milling and breaching in accordance with the teachings of this invention. Perylene reds and indanthrones may also be used as starting materials for the present process. Most of the above organic materials exist in two or more crystalline modifications, which differ from each other in solubility, shade and stability. It is common to call the meta-stable form the alpha form and other, more stable, crystalline forms, beta, gamma, etc. The various forms are readily identified from X-ray diffraction patterns and/or infrared spectra. Alteration of crystal structure can take place when certain forms of the organic pigments are stored in an organic vehicle containing deleterious solvents, particularly in certain paint or lacquer vehicles containing powerful aromatic solvents. Care should be taken in the selection of vehicles to remove such deleterious solvents or avoid their use.

After milling the crude pigment, an extraction step is ordinarily used to remove impurities; however high grade crude does not always require the extraction step. Where salt grinding aid is employed in the milling step, the acid extraction with water and dilute mineral acid separates the salt from the comminuted pigment. Aqueous sulfuric acid in a concentration of about 1 to 5%, preferably about 2%, is used commercially for this extraction in sufficient amount to dissolve the salt grinding aid and remove the impurities from the milled pigment. Treatment under slow agitation in dilute mineral acid at about 25–35° C. for about 1 hour using a ratio of about 10 parts acid solution per part of pigment is adequate for most acid extractions.

After the acid treatment, the pigment may be recovered from the extraction liquid by filtration, etc.; however, it is advantageous in the practice of the present invention to by-pass the recovery at this step and add the breaching agent directly to the fluent slurry of pigment, grinding aid, impurities and aqueous mineral acid. This gives an acid pH to the breaching treatment. Addition of the phenolic material can agglomerate the pigment under proper conditions, thus permitting easy separation of the agglomerated pigment and breaching agent phase from the liquid extract containing salt, acid and impurities. This separation can be made merely by decanting or straining the mixture through a coarse cloth, such as 60 to 100 mesh wire sieve or woven fiber cloth. The purification of milled pigment is not a necessary part of this invention and is conventional in every aspect except the addition of breaching agent at the end of the extraction prior to separation of the pigment and acid liquor.

During the breaching step, intimate contact between the phenolic breaching agent and the partially milled pigment must be obtained. In order to accomplish this, it is preferred that the breaching be carried out under high shear conditions with the pigment and breaching agent agitated vigorously while suspended in a liquid carrier such as water. Using an aqueous carrier for the breaching step in an amount at least equal to about 2–5 parts water per part of combined pigment and breaching agent, adequate contact to effect the required conditioning can be obtained in only a few minutes in high shear apparatus such as a Kady mill, Cowles mill, or Waring blendor. Typically, ten minutes or less is needed. The use of a liquid carrier permits less breaching agent. High shear is not necessary to provide adequate conditioning by breaching if sufficient time is permitted under slow agitation or absent agitation. For instance, complete breaching can be obtained by permitting the phenol breaching agent to contact the partially milled pigment over a period of several hours. A surfactant may be used to promote the breaching. Temperature does not appear to be a critical factor. Where an aqueous carrier is used in the agitation, the breaching step may be carried out at a temperature of about 0 to 100° C., preferably about 20 to 80° C. When using high shear apparatus, a cooling jacket may be used to control the breaching temperature. To avoid drying, deterioration, and air pollution, the pigment and breaching agent should be stored and used in closed vessels or under inert liquid cover.

The bleaching agent used in the practice of this invention consists essentially of one or more phenolic compounds which is substantially insoluble in water at a pH of 7 or less. In general, those phenol compounds or mixtures having a solubility in water at room temperature of about 10% by weight or less are suitable. Since phenols ionize in aqueous media as acids, increasing the pH of the system tends to solubilize the phenol breaching agent. Therefore, it is preferred that the breaching treatment be carried out at neutral or acid pH to minimize the breaching agent solubility in aqueous media. In addition, the preferred breaching agents have a normal melting point below about 100° C. Reactive groups which are deleterious to the pigment by changing the chemical or crystalline structure should be avoided.

Preferred phenol breaching agents include those compounds having the structure:

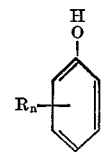

where R is an organic radical selected independently from lower alkyl, lower alkoxy, nitrile, nitro, lower acyl, aryl of 6 to 10 carbon atoms, and halogen, and where $n$ is an integer from 0 to 5.

These phenols are usually inert nuclear hydroxy-substituted aromatic compounds having 6 to 10 carbon atoms, or where a mixture of phenols is used, having an average of 6 to 10 carbon atoms. Mononuclear phenols are generally lower-melting than fused aromatic hydroxy-substituted compounds. While it is not necessary to have the breaching agent entirely in the liquid state, it is preferred to have a fluent mixture during the breaching treatment in order that the phenol may diffuse along the grain boundaries and into interstitial areas of the pigment aggregates during the period of intimate contact. Where aqueous systems are employed in the breaching treatment it is preferred that the breaching agent be a liquid under the treatment conditions and not solidify or evaporate at ambient temperature.

Typical breaching agents include the parent compound, phenol, and lower alkyl-substituted phenols, such as m-cresol, o-cresol, p-cresol, and p-ethylphenol. Polysubstituted phenols such as the xylenols may be used, including 3,4-dimethylphenol.

The following phenolic compounds have a melting point below 100° C.:

| Compound: | M.P. (° C.) |
|---|---|
| 4-bromo-2,6-dimethylphenol | 80–81 |
| m-Bromophenol | 28–30 |
| o-Bromophenol | 3–5 |
| p-Bromophenol | 64–66 |
| p-Butoxyphenol | 63–65 |
| 6-tert.-butyl-m-cresol | 18–21 |
| o-tert.-Butylphenol | 89–90 |
| p-sec.-Butylphenol | 45–55 |
| 4-tert.-butylpyrocatechol | 94–99 |
| 4-chloro-3-methylphenol | 64–66 |
| 4-chloro-2-methylphenol | 47–49 |
| 2-chloro-6-nitrophenol | 70–71 |
| 4-chloro-2-nitrophenol | 86–89 |
| m-Chlorophenol | 31–33 |
| o-Chlorophenol | 7–9 |
| p-Chlorophenol | 33–38 |
| 2-chloro-4-phenylphenol | 73–75 |
| m-Cresol | 8–10 |
| o-Cresol | 29–31 |
| p-Cresol | 32–35 |
| 4,6-dibromo-o-cresol | 55–56 |
| 2,6-dibromo-p-cresol | 48–49 |
| 2,4-dibromophenol | 35–36 |
| 2,6-dibromophenol | 54–56 |
| 2,6-di-tert.-butyl-p-cresol | 62–68 |
| 2,6-di-tert.-butylphenol | 33–36 |
| 2,5-dichlorophenol | 56–58 |
| 2,6-dimethoxyphenol | 54–56 |
| 2,4-dimethylphenol | 22–24 |
| 2,5-dimethylphenol | 73–76 |
| 2,6-dimethylphenol | 45–47 |
| 3,4-dimethylphenol | 64.5–66.5 |
| 3,5-dimethylphenol | 64–65 |
| 4,6-dinitro-o-cresol | 85–86 |
| 2,4-di-tert.-pentylphenol | 24–26 |
| o-Ethoxyphenol | 25–27 |
| p-Ethoxyphenol | 64–67 |
| o-Ethylphenol | 45 |
| p-Fluorophenol | 47–49 |
| 2'-hydroxyacetophenone | 4–6 |
| 3'-hydroxyacetophenone | 93–95 |
| p-Methoxyphenol | 54–56 |
| m-Nitrophenol | 96–98 |
| o-Nitrophenol | 44–46 |
| p-Pentylphenol | 20–22 |
| p-tert.-Pentylphenol | 93–95 |
| Phenoxyphenol | 81–83 |
| α-Phenyl-o-cresol | 52–54 |
| α-Phenyl-p-cresol | 83–85 |
| m-Phenylphenol | 77–78 |
| o-Phenylphenol | 58–60 |
| 2,3,4,6-tetrachlorophenol | 57–60 |
| 2,4,6-tribromophenol | 93–95 |
| 2,4,5-trichlorophenol | 57–63 |
| 2,4,6-trichlorophenol | 67–68 |

While the use of aqueous media for the breaching step is preferred from the viewpoint of economical operation of the process, satisfactory breached pigments may be made with substantially non-aqueous systems. Phenols having a melting point above the normal boiling point of water can be used molten, either alone, in mixtures, or with an inert liquid diluent in the breaching step. The following high melting phenols may be suitable for breaching under some conditions.

| Compound: | M.P. (° C.) |
|---|---|
| 3-aminophenol | 122–3 |
| 2,4-dichloro-α-naphthol | 106–7 |
| 4,6-dichloro-2-nitrophenol | 122–3 |
| o-Dicresol | 161 |
| 2,4-dihydroxytoluene | 104–5 |
| 2,3-dinitrophenol | 144–5 |
| 2,4-dinitrophenol | 112.9 |
| 2,5-dinitrophenol | 104 |
| 3,4-dinitrophenol | 134 |
| 3,5-dinitrophenol | 123 |
| Nitrochlorophenols | 38.9–147 |

The amount of breaching agent necessary to promote full conditioning varies with the type of pigment, the phenolic material, time and temperature of the breaching step, shear energy, and the amount of liquid carrier used. When high shear equipment is employed to agitate the pigment and breaching agent in a water slurry, less breaching agent per unit of pigment is required. Typically, at least about 10 to 50 parts breaching agent per 100 parts pigment can produce the desired conditioning, with about 50 to 200 parts being preferred. The proper conditioning amount of breaching agent is usually in the range of about 10 to 300 parts per 100 parts pigment. Greater amounts may be used; however, the economical operation of this process may limit the amount of breaching agent used, even when it is recovered and recycled.

The breaching agent may be separated from the conditioned pigment by several procedures, including vacuum or steam distillation. One of the advantages of the phenols as breaching agents is the ease with which these breaching agents may be separated by leaching with a suitable liquid solvent or solubilizing base. Most phenols of the type described herein form water-soluble salts with inorganic and organic bases. Alkali metal bases, such as aqueous solutions of sodium hydroxide, potassium hydroxide, or lithium hydroxide, are preferred as solubilizing bases for separating the phenol breaching agents from the pigment solids. By adding 0 to 20% stoichiometric excess, calculated on the amount of phenol used, the breaching agent is rendered water-soluble. Other aqueous bases such as ammonia or amines can also be used. The pigment is easily recovered by filtering or centrifuging the pigment and solubilizing liquor and washing with hot water.

The breaching agent may be recovered for recycle; in which case the phenol-rich mother liquor from the separation should be separated from the washings. By acidification of the phenol-containing portion, the breaching agent can be rendered relatively insoluble. Some small amount of water (typically about 10%) can be recycled with the recovered phenol. Breaching agent carried by the final wash water can be recovered by absorption from the effluent on activated charcoal.

Water alone can be used to remove the breaching agent if the phenol has sufficient solubility. Hot water (80–100° C.) can wash out the parent phenol and cresols, which have fairly high water solubility at elevated temperatures. A dilute basic wash speeds the recovery and insures that the pigment will not have traces of the breaching agent. Carbonate ion suppresses the solubility of phenols and should be avoided in both aqueous solubilizing bases and wash water.

As compared to evaporation methods for removing breaching agents, the solubilization or water washing methods product presscakes much more prone to water dispersibility. The presscakes from high shear agitation systems are smoother and of higher water content. The presscakes from medium to low shear agitation systems can be made of a relatively low water content, desirable for some uses. Despite the lower water content, the soft granules of the latter presscakes are readily dispersed by reasonably high shear systems such as the Kady mill. In this respect, the high pigment content presscakes are much superior to presscakes achieved by prior art.

Typically, the pigments obtained by this improved process are stronger in tinctorial strength than comparable pigments produced by dry milling alone. These products are among the highest quality pigments obtainable. For instance, a partially ball milled copper phthalocyanine blue pigment made by milling for one half the usual time and using less than ½ the usual amount of salt grinding aid, can be much stronger using the novel breaching step than that produced by the usual dry milling procedure. The phenolic breaching agents are also superior to the best known prior art breaching agents, such as chloroform, while allowing more economical production.

Example 1

Crude copper phthalocyanine blue pigment is conditioned by ball milling with 3.75 parts coarse sodium chloride grinding aid per part of pigment using ⅝ inch hardened steel ball grinding elements. The starting material is an unsubstituted copper phthalocyanine crude of 92% purity. The production size ball mill is charged with 800 parts of steel balls and preheated to 120° C. with a heat exchange jacket. To the heated mill is charged 217 parts of crude pigment and 750 parts of dried sodium chloride salt. The average mill volume of these components is about 1.70 g./cc. for the steel balls, 0.17 g./cc. for the salt, and 0.043 gm./cc. for the pigment. The grinding is continued for about 16 hours at about 15 r.p.m. at a temperature of 150°–155° C. The contents remain free flowing during the milling cycle. The partially milled pigment and grinding aid are separated from the steel balls and the mill is discharged by a conventional pneumatic conveying system. A green shade (beta form) copper phthalocyanine blue pigment is recovered.

Example 2

The following procedure is used for treating 100 parts of dry milled pigment (100% purity basis). The ball mill discharge from Example 1 is dispersed in 1000 parts water by wetting the pigment and salt mixture and agitating the wetted mixture with water in a high speed mixer. The aqueous slurry is charged to an extraction vessel equipped with a motor-driven turbine agitator and stirred slowly while a mixture of 41 parts sulfuric acid (98% $H_2SO_4$) and 239 parts cold water is added, maintaining a temperature greater than about 25° C. The acid extraction is carried out for about 1 hour at 25°–35° C. At this point the agitation is increased and 100 parts of a mixture of o-cresol (82%) and phenol (18%) breaching agent is added and stirred for about 10 minutes. Agglomeration of the pigment and phenolic breaching agent takes place within about 5–6 minutes if the addition is made all at one time. This phase separation is sharp and the resulting mixture is easily decanted if the breaching agent is added to the pigment slurry at about 25°–35° C. The agglomerated pigment and phenolic mixture rises to the surface of the aqueous acid extract liquor; however, if stirring is continued, the organic phase will ball up. The agglomerated organic phase is separated from the aqueous phase by decanting or pouring the mixture through a coarse sieve. The agglomerated pigment and breaching agent is removed from the sieve and mixed with 1000 parts of cold water in a jacketed high shear Kady mill for 15 minutes while maintaining the breaching temperature at ambient by cooling.

The o-cresol/phenol mixture is separated from the treated pigment by solubilizing with 88 parts of 50% NaOH, which is stirred at moderate speed with the mixture for about 1 hour at basic pH. The pigment is recovered by filtration and washed with hot water until the filtrate is colorless and neutral in pH.

The amount of solubilizing base usually amounts to about 15% stoichiometric excess over the phenolic compounds present. The major amount of breaching agent is recovered by acidification of the first filtrate liquor. The acid extract liquor can be used for this acidification to neutralize most of the base. The granular presscake has a dry content of about 54% pigment and the overall yield (100% pure basis) is 97% of theory.

Comparative tests were conducted for the green shade copper phthalocyanine blue sample prepared above and a positive control prepared by fully conditioning the pigment by milling. The positive control was a fully milled pigment ground for 32 hours under substantially the same conditions as the partially milled pigment, except that 9 parts of salt per part pigment were required to obtain full pigmentary strength. This fully milled pigment was acid extracted in the same manner as the partially milled pigment, and both positive control and sample were dried at 70° C. prior to incorporation into an organic vehicle for pigment testing. The sample is about 4% stronger in tinctorial strength, slightly greener and brighter than the positive control. Comparisons are made by a standard rubout procedure as follows: 0.5 g. pigment is mulled on a Hoover Muller with 1.0 g. IPI varnish. Dry, untreated pigments are mulled 6×100 passes; resinated toners are mulled 4×50 passes. Inks thereby prepared are pulled down for masstone, printone, and undertone comparisons. Tints are made from the masstone inks by mixing with a spatula 0.1 g. ink and 5.0 g. of a zinc oxide paste. The zinc white paste must be previously prepared by mixing at two passes over a three-roll mill 384 g. zinc oxide, 108 g. No. 0 regular litho oil, 6 g. petrolatum, 4 g. cobalt linoleate resinate (3.6% Co), and 3 g. methyl ethyl ketoxime solution.

The percent deviation in strength is found by reducing the amount of ink from the stronger pigment such that when mixed with 5.0 g. zinc oxide paste, a match in tint strength with the weaker pigment is obtained. The percentage by which the ink was reduced to make the match is reported as percent strength. A positive sign is used to show the sample is stronger than the standard; a negative sign shows the standard is stronger than the sample.

Examples 3–10

To demonstrate the effect of milling time on the final pigmentary properties of breached and unbreached pigments, the grinding procedures of Example 1 are repeated except that the mill is a laboratory size ball mill. The scale down of average volume loading for the grinding elements, salt and pigment gives equivalent conditions for substantially all variables, except milling time, which is longer for small mills. The acid treatment consists of mixing the ball mill discharge with 5 parts of 5% aq. $H_2SO_4$ per part of salt and pigment and heating to 95°–100° C. for about ½ hour with stirring. The pigment is recovered by filtering and washing. The breaching treatment follows Example 2 except that the breaching agent, pigment and water are agitated for 5 minutes in a Waring Blendor at high speed. The breaching treatment is omitted in Examples 4, 6, 8, and 10, the negative control samples. The positive control herein is the same as for Example 2. The results are tabulated below.

TABLE I

| Example | Milling time (hrs.) | Breaching | Rubout evaluation vs. positive control | | |
|---|---|---|---|---|---|
| | | | Masstone | Tint shade | Strength |
| 3 | 15 | Yes | Chalky | Sl. dull | +6 to 7% |
| 4 | 15 | No | | | −36% |
| 5 | 22 | Yes | Sl. jet | Trifle dull | +9% |
| 6 | 22 | No | | | −29% |
| 7 | 40 | Yes | Jet | Trifle green | +10 to 11% |
| 8 | 40 | No | | | −22% |
| 9 | 50 | Yes | Jet | do | +10 to 11% |
| 10 | 50 | No | | | −10% |

Examples 11–15

The plant scale procedure of Example 1 is followed except that the acid extraction step is carried out in a 2% sulfuric acid solution for about ½ hour at 95°–100° C. The extract liquor is flooded with sufficient cold water to reduce the temperature to 60° C., and the pigment solids are separated from the liquor by filtration and washed for 4 hours with cold water. The presscake is breached following the procedure of Example 2. The results are tabulated below:

TABLE II

| Example | Milling time (hrs.) | Rubout evaluation vs. positive control | | Tint strength |
|---|---|---|---|---|
| | | Masstone | Tint shade | |
| 11 | 0 | Very light | Very red and dirty. | −70% |
| 12 | 4 | Considerably light. | Considerably red and dull. | −10% |
| 13 | 8 | Moderately light. | Slightly red and dull. | +2% |
| 14 | 12 | Trifle jet | Trifle green | +6% |
| 15 | 16 | Moderately jet. | Slightly green, trifle bright. | +9% |
| Positive control | 32 | | | |

It has been adequately demonstrated that the combination of partial milling and breaching with a phenolic material produces pigment superior in pigmentary qualtiy to the prior art methods with grinding times of ½ to ¼ that ordinarily required for full conditioning by grinding alone.

Example 16

The pigment is milled by the procedure of Example 1 and the milled pigment is acid extracted as in Example 11. The breaching agent for this example is p-ethylphenol. To a high speed, high shear blender is charged 100 parts pigment with 1180 parts water, and 100 parts ethylphenol. The mixture is mixed at high speed for 5 minutes and the breaching agent is solubilized with 88 parts of 50% NaOH and stirred for 1 hour. The pigment is recovered by filtering, washing with water and drying at 70° C. Compared to the positive control, the sample was slightly jet in masstone, slightly green in tint shade and 6–8% strong in tinctorial strength. The ethylphenol breaching agent performs much like the cresols as a breaching agent. By adding about 20% water to molten ethylphenol (M.P. 45) crystallization at ambient temperature can be retarded.

Example 17

The procedure of Example 16 is repeated except that the breaching agent is 3,4-dimethylphenol. This breaching treatment was carried out at about 60–65° C. to overcome any possible crystallization of the breaching agent. The sample was highly bronze and a trifle jet in masstone, a trifle green in tint shade and 5% strong in tinctorial strength.

Examples 18–37

A partially chlorinated and sulfonated crude copper phthalocyanine blue containing 3% Cl and 0.25% S is milled at 125°–135° C. in a laboratory scale ball mill using steel ball loadings of 1.7–1.9 g./cc., salt loadings of 0.17–0.18 g./cc. and pigment loadings of 0.43–0.46 g./cc. and milling times of 2 to 60 hours. The ball mill discharge is acid treated by extracting about 240 parts of salt and 56–60 parts of pigment with 1500 parts of 5% sulfuric acid at 95–100° C. for ½ hour. The extract liquor is filtered hot and the presscake washed neutral with water. This presscake is treated with the breaching procedure of Example 11 and recovered. The positive control is a fully conditioned pigment milled for about 30 hours at 135° C. in a production scale ball mill with 9 parts salt, using the procedure of Example 1. The comparative results are tabulated below, with Examples 31, 33, 35, and 37 being unbreached negative control samples.

TABLE III

| Example number | Milling time (hrs.) | Rubout evaluation vs. positive control | | Tint strength |
|---|---|---|---|---|
| | | Masstone | Tint shade | |
| 18 | 2 | Very chalky | Green, dull | −41 to −43% |
| 19 | 4 | do | do | −27 to 29% |
| 20 | 6 | Chalky | Green | −13 to −14% |
| 21 | 8 | Slightly chalky | Green, bright | −8% |
| 22 | 10 | do | do | −4% |
| 23 | 10 | Chalky | do | −9 to −10% |
| 24 | 13 | Slightly chalky | Green, slightly bright. | +3 to +4% |
| 25 | 17 | do | do | +3 |
| 26 | 18 | do | do | −6% |
| 27 | 22 | Trace chalky | Green, bright | (¹) |
| 28 | 22 | Trifle chalky | do | −3% |
| 29 | 24 | Trace chalky | Green, slightly bright. | +2% |
| 30 | 30 | Trifle chalky | Trifle red, trifle dull. | −1 to −2% |
| 31 | 30 | | | −31% |
| 32 | 40 | Trifle chalky | Trace green, trifle bright. | (¹) |
| 33 | 40 | | | −22% |
| 34 | 50 | Trifle chalky | Trifle green, trifle bright. | −1% |
| 35 | 50 | | | −18% |
| 36 | 60 | Close | Trifle green | +1% |
| 37 | 60 | | | −10% |

¹ Equal.

Example 38

The milling procedure of Example 1 is repeated except that the starting material is a partly sulfonated copper phthalocyanine blue used for making non-flocculating green shade copper phthalocyanine blue (beta form). The ball milling is carried out in the presence of 2 parts of perchloroethylene phase-directing liquid per 100 parts pigment. The sample is half-milled for 15 hours at 150°–160° C. The positive control is milled for 30 hours using 9 parts salt per part pigment. The mill discharge is acid extracted using the normal procedure with 0.5–1.5% $H_2SO_4$ at 95°–100° C. for ½ hour, flooded to 60° C., filtered and washed with water. The presscake contains about 38.5% pigment.

Example 39

The half-milled pigment from Example 38 is breached with a phenolic material consisting of 82% o-cresol and 18% phenol. The presscake (100 parts dry pigment) is dispersed in 1000 parts water and milled with 125 parts of the breaching agent for 20 minutes on a Kady mill at a temperature of about 35°–45° C. The phenolic material is solubilized by stirring the mixture with 475 parts of 10% NaOH for about 80 minutes, filtering and washing with hot water. The presscake is composed of soft granules and has a dry content of 48%. Compared to the standard rubouts of positive control, the breached sample is jet and bronze in masstone, transparent and red in undertone, a trifle red in tint shade, and 6% strong in tinctorial strength.

Example 40

The procedure of Example 39 is repeated except that the phenolic material is solubilized by mixing for 3 minutes with 95 parts of 50% NaOH on a high shear mill. Mixing in the presence of solubilizing base under high shear conditions results in a fine, smooth presscake of about 34% dry pigment content. The results are essentially the same as above except the tint shade is a trifle bright and the tinting power is 4–5% strong as compared to positive control.

Example 41

The presscake from Example 38 is breached with pure phenol by dispersing 100 parts of the pigment in 1000 parts water and milling with 200 parts phenol at 50–65° C. on a Kady mill for 22 minutes. The breaching agent is solubilized by milling the mixture with 170 parts of NaOH flakes for 3 minutes, separated by filtering and the pigment is washed. In the standard rubout evaluation vs. positive control, the phenol-breached sample is jet and slightly bronze in masstone, transparent and red in undertone, slightly dull in tint shade and 4% strong.

The conditioned pigment presscakes of Examples 39–41 are rosinated with alkaline earth rosinate, dried at 70° C. and micropulverized through a 0.027-inch round hole screen. Rubout evaluations of the resinated pigment vs. a rosinated positive control are tabulated below.

TABLE IV

| Ex. No. | Masstone | Undertone | Tint shade | Tint strength |
|---|---|---|---|---|
| 39 | Jet and slightly bronze. | Transparent and red. | Slightly green, slightly bright. | 6% strong. |
| 40 | Jet and some bronze. | Transparent. | Green and bright. | 5% strong. |
| 41 | Jet and slightly bronze. | Transparent and red. | Trace red. | Equal. |

The wet presscakes of Examples 39–41 are dispersed in a standard commercial white latex paint as non-ionic tint colors compared with the positive control for tinctorial strength. Example 39 is 20–22% strong and the tint shade is green. Example 40 is about 14% strong and green. Example 41 is about 5% strong and slightly green.

Example 42

The presscake from Example 38 is breached with 125 parts of p-cresol according to the procedure of Example 16 using high shear for 5 minutes. The cresol is solubilized with 109 parts 50% NaAH. The rubout evaluation vs. a sample breached by equivalent procedure using o-cresol/phenol shows the sample to be a trifle cloudy in masstone, a trifle opaque in undertone, a trace red in tint shade and equal in strength.

Examples 43–44

Example 42 is repeated using o-cresol and again using m-cresol. The solubilizer base is 72 parts 50% NaOH. These samples were compared to the o-cresol/phenol breached sample. The o-cresol breached sample is a trace jet in masstone and about 1% strong. The m-cresol breached sample is a trifle red in tint shade and about 1% strong.

The breaching agents containing a major amount of cresol appear to be the best breaching agents tested. Those mixtures of about 80–85% cresol with 15–20% phenol give about the same results as pure cresols despite the fact that phenol by itself is substantially less active as a breaching agent than the methyl-substituted phenols.

Example 45

A quinacridone violet pigment is made by the procedure of U.S. Pat. 3,547,926 with 20 parts α-phase quinacridone crude, 180 parts sodium chloride salt grinding aid and 2500 parts of hardened steel balls. These components are dried and milled in a laboratory ball mill at 150° C. The positive control is milled for 48 hours. The negative control and the half-milled sample for breaching are milled 24 hours. The ball mill discharge is extracted in 1000 parts of 5% sulfuric acid at 95°–100° C. for ½ hour, filtered and washed. The sample is breached using the procedure of Example 16 by treating 100 parts of pigment with 100 parts of o-cresol/phenol breaching agent in 1000 parts water under high shear agitation for 5 minutes. The breaching agent is solubilized with 170 parts of 50% NaOH, filtered, washed and dried. The unbreached negative control and the positive control were redispersed in hot water, refiltered and dried. The results are discussed with the following example.

Example 46

Quinacridone red pigment is made by the procedure of U.S. Pat. 3,547,925 with 15 parts α-quinacridone crude, 180 parts salt, 2250 parts hardened steel balls, 250 parts No. 6d nails and 3.2 parts pyridine. The charge is ball milled at 90° C. as in Example 45 with the breached sample and negative control being half-milled at 24 hours. The acid extraction and breaching procedures are the same as Example 45.

For both the violet quinacridone (β-phase) and the red quinacridone (γ-phase) the breaching treatment deepened the masstone, increased the tinctorial strength, and brightened the tint shade of the breached sample as compared to the half-milled negative control. The breached samples were deeper in masstone, slightly yellower and much brighter in tint shade than the positive controls. The violet quinacridone sample was 8–9% weaker in tinctorial strength than its positive control; however, the more desirable masstone and brightness offset this. The red quinacridone was equal in strength to the positive control.

Several alternative processes have been presented in detail, with different sequences and process variables. Modifications of the above processes are within the skill of pigment manufacturing techniques. In another, alternative process, the partially milled crude pigment and salt grinding aid are mixed with a liquid phenolic breaching agent and filtered to remove at least a portion of the liquid phenolic breaching agent, which is recycled for further use. The filtered solid presscake, containing conditioned pigment, salt and some phenolic material, is treated with a solubilizing base, such as NaOH in water, to remove the salt, impurities, and the solubilized phenolic material. The recovered pigment may be washed or otherwise treated to remove impurities.

While the invention has been demonstrated with reference to specific examples, there is no intent to limit the inventive concept except as set forth in the appended claims.

I claim:

1. A process for conditioning partially milled copper phthalocyanine blue pigment, consisting essentially of:
    (a) mixing the pigment with about 10 to 300 parts of breaching agent per 100 parts by weight of dry pigment in an aqueous dispersion with sufficient water to form a fluent mixture, said breaching agent consisting essentially of one or more mononuclear phenols having low solubility in water;
    (b) contacting the mixture with agitation at a temperature in the range from ambient temperature to the boiling range of the mixture for sufficient time to further condition the pigment; and
    (c) separating the pigment from the water and breaching agent.

2. The process of claim 1 wherein the copper phthalocyanine contains less than 10 halogen atoms per molecule; and wherein the phenols are selected from phenol, cresols, xylenools and mixtures of these phenols.

3. The process of claim 2 wherein the agitation step is carried out at ambient pressure and in the temperature range of about 0° C. to 100° C.

4. The process of claim 3 wherein the breaching agent consists essentially of 50 to 200 parts phenol per 100 parts of phthalocyanine pigment and the step (b) is conducted at about 35° C. to 65° C.

5. The process of claim 1 wherein step (b) is carried out at a pH of about 7 or less.

6. The process of claim 1 wherein the breaching agent is separated from the pigment by solubilizing the breaching agent with an aqueous solubilizing base.

7. The process of claim 6 wherein the solubilizing base consists essentially of aqueous alkali metal hydroxides, ammonia or amines.

8. The process of claim 1 wherein the breaching agent is separated from the pigment by washing with hot water.

9. A process for manufacturing organic pigments comprising the steps of:
    partially conditioning a crude pigment by dry milling to an extent substantially less than that amount of milling required to develop full pigmentary strength;
    extracting impurities from the partially conditioned pigment with a dilute aqueous mineral acid;
    breaching the pigment by agitating the pigment in aqueous slurry with phenol breaching agent which is less than 10% soluble in water and which is active to develop pigmentary qualities by contacting the pigment during the breaching step; and separating the breaching agent from the conditioned pigment, thereby producing a pigment having tinctorial strength substantially equal to that produced by fully conditioning the pigment by dry milling.

10. The process of claim 9 wherein the phenol breaching agent is selected from the class consisting of hydroxy-substituted aromatic hydrocarbons having 6 to 10 carbon atoms.

11. The process of claim 9 wherein the breaching agent is added in an amount about equal to 50 to 200 parts per 100 parts by weight of dry pigment.

12. The process of claim 9 wherein the pigment consists essentially of a phthalocyanine having statistically less than one substituent group per molecule.

13. The process of claim 12 wherein the pigment consists essentially of copper phthalocyanine.

14. The process of claim 9 wherein the breaching agent is added in an amount about equal to 10 to 300 parts per 100 parts by weight of dry pigment.

15. The process of claim 9 wherein the organic pigment is selected from phthalocyanines, quinacridones, dioxazines, perylenes, indanthrones and vat pigments and mixtures of these pigments.

16. In the process wherein a crude organic pigment is conditioned to essentially full pigmentary strength by partial dry milling of the crude pigment and treatment of the partially milled pigment with a breaching agent to promote further conditioning, the improvement which comprises:
(a) contacting the partially milled pigment in an aqueous slurry with a dilute aqueous mineral acid to extract impurities;
(b) mixing pigment slurry with a conditioning amount of phenol breaching agent, said breaching agent being substantially insoluble in the aqueous phase of the pigment slurry, thereby agglomerating the pigment and breaching agent;
(c) separating the pigment and breaching agent from the aqueous phase;
(d) mixing the pigment and breaching agent for sufficient time to further condition the pigment; and
(e) separating the phenol breaching agent from the pigment to recover the conditioned pigment, thereby producing a pigment product having enhanced pigmentary properties substantially equal in tinctorial strength to that obtained by fully conditioning the crude pigment only by milling.

17. The process of claim 16 wherein step (d) is performed under high shear conditions for a mixing time of about 10 minutes or less, at a temperature of about 0–100° C., and at a pH of about 7 or less.

18. The process of claim 16 wherein the phenol breaching agent is selected from phenol, o-cresol, m-cresol, p-cresol, ethylphenol, 3,4-dimethyl-phenol and mixtures of these phenols with one another.

19. The process of claim 16 wherein the organic pigment is a copper phthalocyanine blue or a quinacridone.

20. The process of claim 16 wherein the acid extraction in step (a) is carried out at a temperature of about 25–35° C. for about ½ hour or more, using 1–5% $H_2SO_4$ concentration.

21. The process of claim 16 wherein the partial dry milling of crude pigment is carried out in an attrition-type mill using inorganic salt grinding aid in an amount equal to about 1.5 to 4 parts salt per part of pigment and wherein the milling time is about ¼ to ½ of the time required to develop full pigmentary properties only by dry milling.

22. The process of claim 16 wherein the phenol breaching agent is selected from those compounds having the structure:

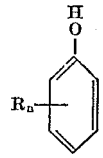

where R is a radical selected independently from lower alkyl, lower alkoxy, nitrile, nitro, lower acyl, aryl of 6 to 10 carbon atoms, and halogen, and where $n$ is an integer from 0 to 5.

23. The process of claim 16 wherein the breaching agent is separated from the conditioned pigment by solubilizing with an aqueous base.

24. The process of claim 16 wherein the phenol breaching agent consists essentially of one or more nuclear hydroxy-substituted aromatic compounds having 6 to 10 carbon atoms.

25. The process of claim 16 wherein the mixing in step (d) is carried out in a fluent aqueous medium with high shear agitation, and wherein the amount of breaching agent is about 50 to 200 parts phenol compound per 100 parts of pigment.

26. The process of claim 25 wherein the amount of water used in the mixing step is at least about 5 parts water per part of pigment plus breaching agent.

27. The process of claim 16 wherein the phenolic breaching agent is solubilized with an aqueous base and separated from the conditioned pigment; and wherein at least a portion of the solubilized breaching agent is recovered by acidification and recycled to step (b) for re-use in breaching.

28. In the process for conditioning crude organic pigments of the class including phthalocyanines having statistically less than one substituent per molecule and quinacridones by comminuting the crude pigment under dry conditions substantially less than that amount to fully condition the pigment by comminuting alone and wherein the partially conditioned pigment is further conditioned by breaching with an organic breaching agent; the improvement which comprises:
contacting the partially conditioned crude pigment with about 50 to 200 parts breaching agent per 100 parts pigment; said breaching agent consisting essentially of at least one phenolic compound selected from phenol and lower alkyl-substituted phenols and having a melting point less than about 100° C.

References Cited
UNITED STATES PATENTS

| 2,857,400 | 10/1958 | Cooper | 260—279 |
| 3,017,414 | 1/1962 | Minnich et al. | 260—279 |

DELBERT E. GANTZ, Primary Examiner

J. W. HELLWEGE, Assistant Examiner

U.S. Cl. X.R.
106—309